(12) United States Patent
Xu

(10) Patent No.: US 9,467,969 B2
(45) Date of Patent: Oct. 11, 2016

(54) PAGING METHOD AND DEVICE FOR MACHINE TYPE COMMUNICATION USER EQUIPMENT

(75) Inventor: Hui Xu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/410,125

(22) PCT Filed: Aug. 23, 2012

(86) PCT No.: PCT/CN2012/080502
§ 371 (c)(1),
(2), (4) Date: Dec. 22, 2014

(87) PCT Pub. No.: WO2014/000336
PCT Pub. Date: Jan. 3, 2014

(65) Prior Publication Data
US 2015/0341898 A1    Nov. 26, 2015

(30) Foreign Application Priority Data
Jun. 26, 2012 (CN) .......................... 2012 1 0213491

(51) Int. Cl.
*H04W 68/00* (2009.01)
*H04W 4/00* (2009.01)
(Continued)

(52) U.S. Cl.
CPC ........... *H04W 68/005* (2013.01); *H04W 4/005* (2013.01); *H04W 4/08* (2013.01); *H04W 68/00* (2013.01); *H04W 68/02* (2013.01)

(58) Field of Classification Search
CPC . H04W 68/005; H04W 68/02; H04W 68/00; H04W 4/005; H04W 4/08

USPC .......... 455/458, 452.1, 464, 466, 515, 552.1
See application file for complete search history.

(56) References Cited

U.S. PATENT DOCUMENTS 6,138,001 A * 10/2000 Nakamura ............ H04J 3/0602
340/7.35
8,929,310 B2 * 1/2015 Faurie ............... H04W 36/0022
370/329

(Continued)

FOREIGN PATENT DOCUMENTS

CN      102118859 A      7/2011
CN      102238477 A     11/2011
(Continued)

OTHER PUBLICATIONS

International Search Report for corresponding application PCT/CN2012/080502 filed Aug. 23, 2012; Mail date Mar. 28, 2013.

*Primary Examiner* — Khai M Nguyen
(74) *Attorney, Agent, or Firm* — Cantor Colburn LLP

(57) ABSTRACT

Provided are a paging method and device for MTC user equipment. The method includes: the MTC user equipment in an MTC user equipment group receives group paging indication information and group paging information transmitted at one or more paging occasions by a network side, where the one or more paging occasions are notified to the MTC user equipment group by the network side or acquired by calculation according to an MTC user equipment group identity, the group paging indication information is used for indicating presence of the group paging information, and the group paging information is used for indicating a change in group trigger information; and, the MTC user equipment determining, according to the group paging information, on whether or not further reading of the group trigger information is needed.

19 Claims, 4 Drawing Sheets

(51) Int. Cl.
*H04W 4/08* (2009.01)
*H04W 68/02* (2009.01)

(56) References Cited

U.S. PATENT DOCUMENTS

2005/0180378 A1* 8/2005 Lee ..................... H04W 4/06
370/345

2011/0051668 A1* 3/2011 Lee ..................... H04W 68/02
370/328
2015/0256959 A1* 9/2015 Jain ..................... H04W 56/00
370/312

FOREIGN PATENT DOCUMENTS

CN 102469585 A 5/2012
WO 2011123755 A1 10/2011

* cited by examiner

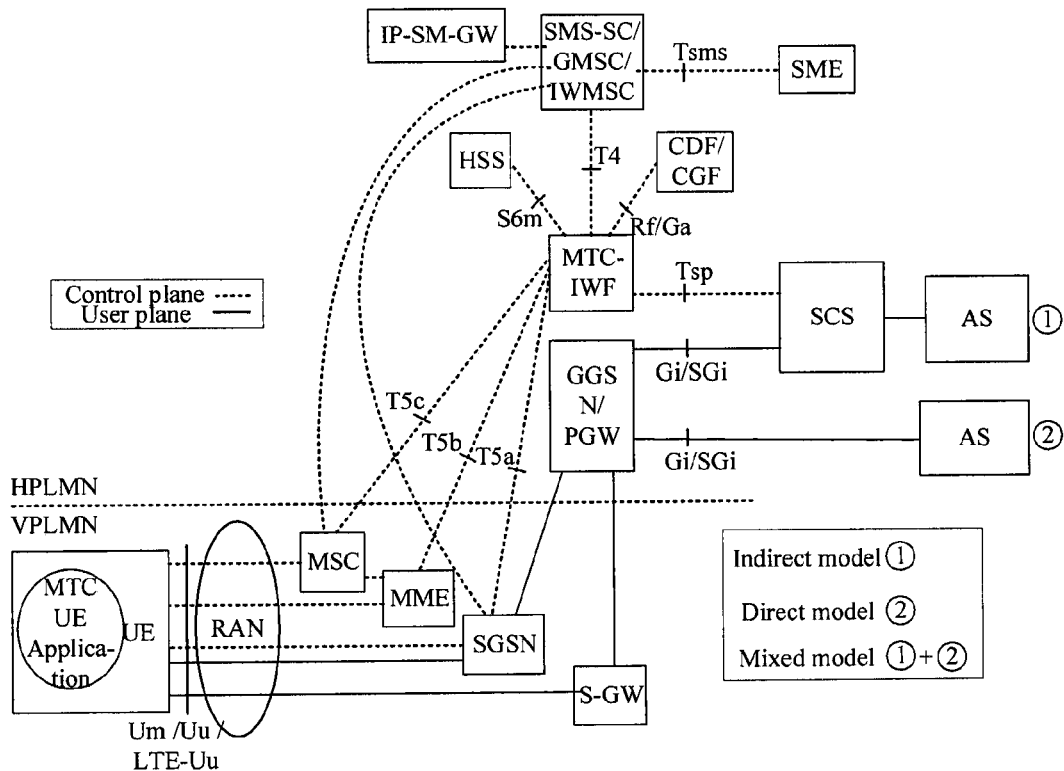

Fig. 1

MTC user equipment in an MTC user equipment group receives group paging indication information and group paging information transmitted at one or more paging occasions by a network side, wherein the one or more paging occasions are notified to the MTC user equipment group by the network side or acquired by calculation according to a group identity of the MTC user equipment group, the group paging indication information is used for indicating presence of the group paging information, and the group paging information is used for indicating a change in group trigger information — S202

The MTC user equipment determining, according to the group paging information, whether it is needed to further read the group trigger information — S204

Fig. 2

PAGING METHOD AND DEVICE FOR MACHINE TYPE COMMUNICATION USER EQUIPMENT

TECHNICAL FIELD

The present document relates to the field of communications, in particular to a paging method and device for machine type communication user equipment.

BACKGROUND

M2M (machine to machine) refers to all techniques and means for establishing connection between machines. The M2M idea has emerged in the 1990s, but only remains at theory stage. After the year of 2000, with the development of the mobile communication technology, it is possible to realize the networking of machinery equipment through the mobile communication technology. M2M services emerge on the market around the year of 2002, and rapidly develop over the following years, which become the focus of attention of multiple communication equipment manufacturers and telecommunication operators. At present, the number of machines around the world is much larger than that of humans, and therefore, the good market prospect of the M2M technique can be contemplated.

The study on the application scenarios of the M2M communication indicates that there is potential market prospect for providing the M2M communication on a mobile network. However, the M2M services provide many new requirements on the system. In order to enhance the competitiveness of the mobile network in this aspect, it is necessary to optimize the existing mobile network, so as to support the M2M communication more effectively.

The existing mobile communications network is mainly designed with respect to interpersonal communication, and the optimization on the machine-to-machine and man-to-machine communication is insufficient. In addition, how to enable the operators to provide the M2M communication services at a low cost is also the key to the successful deployment of the M2M communication.

On the basis of the above-mentioned situations, it is necessary to study a solution for the mobile network to support the M2M communication which can make the maximum reusing of the existing network, and reduce the influence of multiple M2M communications on the network and the complexity of operation maintenance.

At present, the competition of the telecommunication market becomes increasingly fierce, the tariff continually reduces, the profit margin of the operators continually decreases, and the communication market based on humans gets saturated, consequentially, the M2M becomes a brand-new development opportunity for the operators.

In order to use mobile network resources effectively, the 3rd generation partnership project (3GPP) provides machine type communication (MTC), that is, machine to machine and machine to man communication services. The service scope of the MTC goes far beyond that of the previous human to human (H2H) communication. The MTC is very different from the current H2H communication mode in the aspect of access control, accounting, security, quality of service (QoS), service mode, etc.

In a 3GPP evolved packet system (EPS) architecture, the EPS includes a radio access network (such as a UMTS universal terrestrial radio access network (UTRAN), an evolved UTRAN (E-UTRAN), a GSM/EDGE radio access network (GERAN)) and a core network. For example, there are elements such as a mobility management entity (MME), a serving gateway and a packet data network gateway (PGW) in an evolved packet core (EPC) network; and a GPRS core network includes elements such as a service GPRS support node (SGSN). The E-UTRAN includes an evolved node B (eNB).

MTC device trigger is one of the basic requirements for an MTC system, and this requirement focuses on the following problem: in order to control the communication of the MTC user equipment, the method of initiating a poll by an MTC server can be used to communicate, and for the communication initiated by the MTC user equipment, it also needs to poll data from the MTC user equipment by the MTC server sometimes. If the query of the MTC server fails or the IP address of the MTC user equipment is unavailable, then the MTC server can use the MTC device trigger to establish communication with the MTC user equipment. If a network cannot trigger the MTC user equipment, the network reports to the MTC server that the MTC device trigger fails, and the MTC device trigger is realized in the 3GPP through control plane signalling.

The MTC device trigger includes mobile originated (MO) and mobile terminating (MT) services, that is, includes the MTC user equipment transmitting or receiving information.

In order to realize the effective transmission of an MTC device trigger request, the proposed solutions include: transmitting MTC device trigger information through T4 interface, or transmitting the MTC device trigger information through T5 interface control plane signalling, or transmitting the MTC device trigger information through a Gi/SGi interface user plane. As regards the method for transmitting the MTC device trigger information through the control plane signalling, an MTC server transmits the control plane signalling containing the MTC device trigger information to a network node; and the network node performs parsing processing on the MTC device trigger information in the control plane signalling, and then transmits the MTC device trigger information to user equipment (UE). The MTC architecture in the 3GPP is as shown in FIG. 1. In the user plane, an MTC application connecting an MTC user communicates with the MTC server through an application programming interface (API), or directly communicates with a gateway GPRS support node (GGSN)/PGW/evolved packet data gateway (EPDG) in the 3GPP network through a Gi/SGi interface; the MTC server communicates with the GGSN/PGW/EPDG through an MTCi interface; and the GGSN/PGW/EPDG communicates with user equipment through a radio access network (RAN). In the control plane, the MTC server transmits the control plane signalling containing the MTC device trigger information to an MTC inter working function (MTC-IWF) through an MTCsp interface or transmits the control plane signalling containing the MTC device trigger information to a short message service-service centre (SMS-SC)/IP-short-message-gateway (IP-SM-GW) through an MTCsms interface, and the MTC-IWF or the SMS-SC/IP-SM-GW transmits the control plane signalling to an MME/SGSN or gateway MSC for short message service (SMS-GMSC) or an SMS router or a mobile-services switching centre (MSC) or a visitor location register (VLR) and then transmits same to the UE through the RAN, wherein the MME/SGSN may also obtain the control plane signalling from a home subscriber server (HSS) or a home location register (HLR) through a Gr/S6a/S6d interface.

The demands for grouping MTC user equipment is proposed in 3GPP TS22.368, for example, the MTC server may want to collect the status information about multiple pieces of MTC user equipment. The system may associate one piece of MTC user equipment to a single MTC group; each group-based MTC function is applicable to each member of an MTC group; and the identity of the MTC group is unique in the 3GPP network.

Paging is to indicate an MT information request or a system information modification to target user equipment, and the target UE receiving the paging information establishes a connection with a network side or reads the modified system information according to the indication of the paging information. The scope of the paging is usually a registration region of the UE, and the paging is usually transmitted at a particular time, wherein the particular time is obtained by the calculation according to the UE identity, and therefore, each UE has its corresponding paging time. An idle state or connection state UE monitors the paging at a paging time thereof.

Triggering one group of MTC UE belongs to an MT process, and before a target MTC UE receives the trigger information, the network side needs to page the UE, and the MTC UE receiving the paging further reads the trigger information.

In the related art, there is no solution of how to page one group of MTC user equipment.

SUMMARY

Provided in the embodiments of the present document are a paging method and device for MTC user equipment, so as to at least solve the problem in the related art that there is no solution of how to page one group of MTC user equipment.

According to one embodiment of the present document, provided is a paging method for MTC user equipment, including: MTC user equipment in an MTC user equipment group receiving group paging indication information and group paging information transmitted at one or more paging occasions by a network side, wherein the one or more paging occasions are notified to the MTC user equipment group by the network side or acquired by calculation according to a group identity of the MTC user equipment group, the group paging indication information is used for indicating presence of the group paging information, and the group paging information is used for indicating a change in group trigger information; and the MTC user equipment determining, according to the group paging information, whether it is needed to further read the group trigger information.

In the described embodiment, the MTC user equipment determining, according to the group paging information, whether it is needed to further read the group trigger information, the method further includes: the MTC user equipment monitoring the group paging indication information at the one or more paging occasions; and if the group paging indication information is detected, the MTC user equipment reading the group paging information.

In the described embodiment, the MTC user equipment determining, according to the group paging information, whether it is needed to further read the group trigger information includes: the MTC user equipment judging, according to a group identity in the group paging information, whether the group paging information is corresponding to the MTC user equipment group; based on a result of the judging representing that the group paging information is corresponding to the MTC user equipment group, the MTC user equipment reading the group trigger information, wherein the group trigger information is used for triggering the MTC user equipment in the MTC user equipment group; and based on a result of the judging representing that the group paging information is not corresponding to the MTC user equipment group, the MTC user equipment discarding the group paging information and continuing to monitor the group paging indication information.

In the described embodiment, before the MTC user equipment in the MTC user equipment group receives the group paging indication information and the group paging information transmitted at the one or more paging occasions by the network side, the method further includes: a service node of the MTC user equipment group receiving the group trigger information and determining the one or more paging occasions; the service node transmitting the group trigger information to an access network node and transmitting information of the one or more paging occasions to the MTC user equipment group through the access network node; and the access network node transmitting the group paging indication information and the group paging information to the MTC user equipment group at the one or more paging occasions.

In the described embodiment, the service node includes at least one of the following: a mobility management entity (MME), a serving general packet radio service support node (SGSN), and a mobile switching centre (MSC).

In the described embodiment, the service node of the MTC user equipment group determining the one or more paging occasions includes: if the group trigger information corresponds to multiple service nodes, an MTC interworking function specifying the one or more paging occasions, or the multiple service nodes determining the one or more paging occasions through negotiation.

In the described embodiment, calculating the one or more paging occasions according to the group identity of the MTC user equipment group includes: the network side calculating one or more paging occasions for sending paging according to the group identity; and the MTC user equipment calculating one or more paging occasions for receiving the paging according to the group identity.

In the described embodiment, the group identity includes at least one of the following: a group ID and a group international mobile subscriber identity (IMSI).

In the described embodiment, the group paging indication information is physical layer information, and is indicated in the form of a group radio network temporary identity (RNTI).

In the described embodiment, the group paging information includes at least the group identity of the MTC user equipment group, wherein the group identity includes at least one of the following: a group ID and a group IMSI.

In the described embodiment, the group paging indication information is transmitted through a dedicated physical channel or is indicated by a dedicated identity on a universal physical channel; and the group paging information is transmitted through system information or dedicated paging information.

In the described embodiment, there are one or more paging occasions.

In the described embodiment, the network side includes at least: an MTC-interworking function (MTC-IWF), an MME, an SGSN, an eNB, a NodeB, a radio network controller (RNC) and a base station controller (BSC).

According to another embodiment of the present document, provided is a paging device for a machine type communication (MTC) user equipment, wherein the paging device is applied to MTC user equipment and includes: a reception module, which is configured to receive group paging indication information and group paging information transmitted at one or more paging occasions by a network side, wherein the one or more paging occasions are notified to the MTC user equipment group by the network side or acquired by calculation according to a group identity of the MTC user equipment group, the group paging indication information is used for indicating presence of the group paging information, and the group paging information is used for indicating a change in group trigger information; and a determination module, which is configured to determine, according to the group paging information, whether or not further reading of the group trigger information is needed.

In the described embodiment, the group identity includes at least one of the following: a group ID and a group IMSI.

In the embodiments of the present document, the network side transmits the group paging information and the group paging indication information at one or more designated occasions, and the MTC user equipment group determines, according to the group paging indication information and the group paging information, whether or not to read the group trigger information, thus the subsequent operation of communicating with an MTC server is performed. Simultaneous paging of a group of MTC user equipment is implemented, group paging process is optimized, and network resources occupied during the group paging process is reduced.

BRIEF DESCRIPTION OF THE DRAWINGS

Drawings, provided for further understanding of the present document and forming a part of the specification, are used to explain the present document together with embodiments of the present document rather than to limit the present document. In the drawings:

FIG. 1 is a schematic diagram of MTC architecture in the 3GPP according to the related art;

FIG. 2 is a flowchart of a paging method for MTC user equipment according to an embodiment of the present document;

DETAILED DESCRIPTION OF THE EMBODIMENTS

Figure 3:
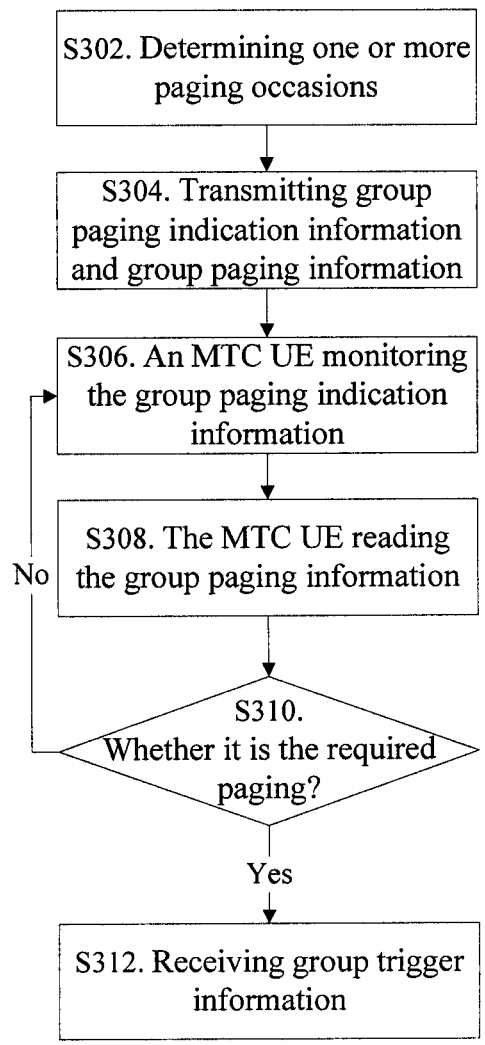
FIG. 3 is a flowchart of a paging method for MTC user equipment according to an example embodiment of the present document.

It should be noted that the embodiments of the present application and the characteristics of the embodiments can be combined with each other if no conflict is caused. The present document will be explained below with reference to the drawings and in conjunction with the embodiments in detail.

An embodiment of the present document provides a paging method for MTC user equipment. FIG. 2 is a flowchart of a paging method for MTC user equipment according to an embodiment of the present document. As shown in FIG. 2, the following steps S202-S204 are included.

Step S202, MTC user equipment in an MTC user equipment group receives group paging indication information and group paging information transmitted at one or more paging occasions by a network side, wherein the one or more paging occasions are notified to the MTC user equipment group by the network side or acquired by calculation according to a group identity of the MTC user equipment group, the group paging indication information is used for indicating presence of the group paging information, and the group paging information is used for indicating a change in group trigger information.

Step S204, the MTC user equipment determining, according to the group paging information, whether it is needed to further read the group trigger information.

In the related art, there is no solution of how to page one group of MTC user equipment. In the embodiment of the present document, the network side transmits the group paging information and the group paging indication information at one or more designated occasions, the MTC user equipment group determines, according to the group paging indication information and the group paging information, whether or not to read the group trigger information, thus communicating with an MTC server subsequently, implementing simultaneous paging of a group of MTC user equipment, optimizing group paging process, and reducing network resources occupied during the group paging process. It should be noted that the MTC server may be an application server (AS) and/or an MTC service capability server (SCS).

The above-mentioned group trigger information may be transmitted through one of the following methods: system information (SI), multicast control channel (MCCH) information and cell broadcast service (CBS) information.

Before step S204, the above-mentioned method may further include the following steps. The MTC user equipment monitors the group paging indication information at the one or more paging occasions; and if the group paging indication information is detected, the MTC user equipment reads the group paging information.

In an example embodiment, step S204 may include the following steps. The MTC user equipment judges, according to a group identity in the group paging information, whether the group paging information is corresponding to the MTC user equipment group; based on a result of the judging representing that the group paging information is corresponding to the MTC user equipment group, the MTC user equipment reads the group trigger information, wherein the group trigger information is used for triggering the MTC user equipment in the MTC user equipment group; and based on a result of the judging representing that the group paging information is not corresponding to the MTC user equipment group, the MTC user equipment discards the group paging information and continues to monitor the group paging indication information.

The situation that the one or more paging occasions are notified to the MTC user equipment via the network side may be realized through the following operations. Before the MTC user equipment in the MTC user equipment group receives the group paging indication information and the group paging information transmitted at the one or more paging occasions by the network side, the above-mentioned method further includes: a service node of the MTC user equipment group receives the group trigger information and determines the one or more paging occasions; the service node transmits the group trigger information received thereby to an access network node and transmits information of the one or more paging occasions to the MTC user equipment group through the access network node; and the access network node transmits the group paging indication information and the group paging information to the MTC user equipment group at the one or more paging occasions.

In an example embodiment, the service node of the MTC user equipment group includes at least one of the following: an MME, an SGSN and a mobile switching centre (MSC).

In an example embodiment, if the group trigger information corresponds to multiple service nodes, an MTC interworking function specifies the one or more paging occasions, or the multiple service nodes determine the one or more paging occasions through negotiation. In this example embodiment, it is realized in the case where the group trigger information corresponds to multiple service nodes, how to determine the one or more paging occasions.

The step of calculating the one or more paging occasions according to the group identity includes: the network side calculates one or more paging occasions for sending paging according to the group identity; and the MTC user equipment calculates one or more paging occasions for receiving the paging according to the group identity.

In an example embodiment, the above-mentioned identity includes at least one of the following: group ID and group IMSI (International Mobile Subscriber Identification Number), wherein the group ID is related to a service/application, that is, the group ID contains a service/application identity.

In an example embodiment, the group paging indication information is physical layer information, and is indicated in the form of a group radio network temporary identifier (RNTI).

In an example embodiment, the group paging information includes at least the group identity of the MTC user equipment group, wherein the group identity at least includes one of the following: the group ID and the group IMSI.

In an example embodiment, the group paging indication information is transmitted through a dedicated physical channel or is indicated by a dedicated identity on a universal physical channel; and the group paging information is transmitted through system information or dedicated paging information.

In an example embodiment, there are one or more paging occasions.

The above-mentioned network side includes at least: an MTC-interworking function (MTC-IWF), an MME, an SGSN, an eNB, a NodeB, a radio network controller (RNC) and a base station controller (BSC).

In order to make the technical solutions and the implementation methods of the embodiments of the present document more apparent, the implementation process thereof is described in detail hereinbelow in conjunction with the example embodiments.

It can be seen from the above-mentioned embodiments that in the embodiments of the present document, the network side transmits group paging indication information and group paging information for paging one group of MTC user equipment at one or more designated occasions; the one group of MTC user equipment monitors the group paging indication information at the one or more designated occasions, and further reads the group paging information according to the detected group paging indication information, and then judges whether the group paging information is needed according to the content of the group paging information.

FIG. 3 is a flowchart of a paging method for MTC user equipment according to an example embodiment of the present document. As shown in FIG. 3, the method includes the following steps.

Step S302, a network side determines one or more paging occasions of MTC UE group paging.

The group paging includes group paging indication information and group paging information.

The network side includes one or more of the following: an MTC-IWF, an MME, an SGSN, an eNB/NodeB, an RNC and a BSC.

The one or more paging occasions refers to one or more time-domain occasions of the paging, that is, a paging time. The one or more paging occasions may be notified to an MTC UE through the broadcast of the system information or can be obtained by calculation according to the group identity. There are one or more paging occasions generally, that is, the same group paging may be transmitted one time or multiple times.

The group paging indication information is used for indicating presence of the group paging information, that is, the appearance of the group paging indication information indicates the presence of the group paging information, and the group paging indication information performs indication through the physical layer information.

Step S304, the network side transmits the group paging indication information and the group paging information to the MTC user equipment at the designated one or more paging occasions.

The group paging indication information may be transmitted through the dedicated physical channel (for example, the paging indication channel (PICH) being used in an UTRAN), or be indicated through a dedicated identity (such as a group RNTI) on a universal physical channel.

The group paging information is transmitted through radio resource control (RRC) signalling at an air interface. In the embodiment of the present document, the group paging information is transmitted by using the system information or the dedicated paging information.

The group paging information contains the group ID, and the MTC user equipment judges whether the paging information is needed through the group ID. The group paging information is used for indicating a change of the system information containing the group trigger information to the MTC user equipment group. The above-mentioned group ID is used for indicating an MTC service or application. An MTC server (AS/SCS) may notify the correlation between the group ID and the MTC service/application through a notice, and the MTC UE judges whether it belongs to a certain group ID through the notice information and the MTC application/service subscribed thereby.

One or more transmitting occasions of the group paging information, such as the value of a group paging frame (PF) and a paging occasion (PO) may be obtained by calculation according to the group ID or group IMSI, or may be designated by the network side.

Step S306, the MTC user equipment monitors the group paging indication information at the designated one or more occasions.

The designated one or more occasions may be obtained through any one of the following methods: reading the system information containing the one or more paging occasions, or according to the one or more paging occasions obtained through calculation (such as calculating the PF/PO through the group IMSI). The group paging indication information is the physical layer (L1) information.

Step S308, the MTC user equipment which has detected the group paging indication information reads the group paging information. The MTC user equipment reads the group paging information at corresponding resources, wherein the content of the group paging information includes the group ID.

Step S310, the MTC UE judges whether the group paging information is needed, if yes, step S312 is executed; otherwise, step S306 is executed. If the MTC UE determines that the group ID in the group paging information is a group to which it belongs, the MTC UE further reads the content of the group trigger information; otherwise, the MTC UE ignores/discards the group paging information and continues to monitor the group paging indication information.

Step S312, the MTC UE further reads the content of the group trigger information.

Example Embodiment I

Figure 4:
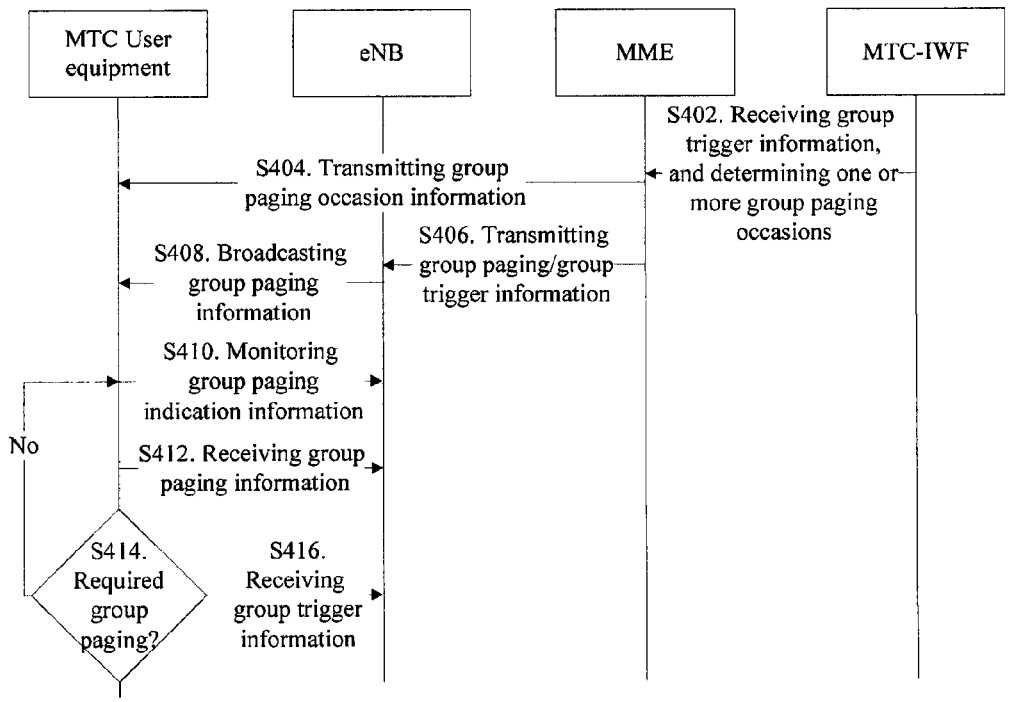
FIG. 4 is an interaction flowchart of a paging method for MTC user equipment according to example embodiment I of the present document.

FIG. 4 is an interaction flowchart of a paging method for MTC user equipment according to example embodiment I of the present document. This example embodiment describes an E-UTRAN system, and paging information is transmitted through system information to realize paging one group of MTC user equipment. As shown in FIG. 4, the method includes the following steps.

Step S402, an MME receives group trigger information and determines one or more group paging occasions.

In this step, the group trigger information may be received through T4 interface or T5 interface. The group trigger information refers to that a target MTC user equipment identity is a group ID, for example, the MME judges that the received trigger information is the group trigger information through the indication information received from an MTC-IWF or through the information queried by an HSS/HLR.

It should be noted that the group trigger information generally contains a region (such as TAI/cell ID) corresponding to the group trigger information, that is, in which regions the group trigger information is transmitted. The group paging occasion refers to a sending time of the group paging, that is, a time-domain occasion. It should be noted that if the group trigger information corresponds to multiple MMEs, then the one or more group paging occasions are designated by the MTC-IWF, or the one or more group paging occasions are determined by the negotiation of the multiple MMEs.

Step S404, the MME broadcasts group paging occasion information to the MTC UE through eNBs.

In this step, the eNBs are all eNBs connected to the MME or eNBs where the target MTC UE is located. The group paging occasion information is transmitted through system information broadcast, wherein the broadcast information includes the transmitting time of the group paging information. Moreover, the broadcast information may further include an MTC user equipment group identity.

Step S406, the MME transmits the group paging information and the group trigger information to the eNB.

In this step, the MME transmits the group paging information and the group trigger information to the eNB through an S1-MME interface. The group paging information includes the MTC user equipment group ID.

Step S408, the eNB transmits the group paging at the one or more paging occasions. The group paging includes the group paging indication information and the group paging information herein, wherein the group paging information is transmitted through the system information, and the system information may be existing system information (such as the system information corresponding to the MTC UE) or the dedicated system information.

Step S410, the MTC UE monitors the group paging indication information at the one or more paging occasions.

The group paging indication information refers to the information indicated in the form of group RNTI in a physical downlink control channel (PDCCH), wherein the group RNTI is an identity specially aiming at the group paging, and the group RNTI is a specifically agreed identity.

Step S412, the MTC UE which has detected the group paging indication information reads the group paging information.

In this step, the MTC UE detects the group RNTI in the PDCCH, which indicates that the information is the group paging indication information. The group paging information is used for indicating the change of the system information containing the group trigger information to the MTC user equipment group. The content of the group paging information contains a group ID, and the MTC user equipment judges whether the paging information is needed through the group ID.

Step S414, it is judged whether the group paging information is needed, if yes, step S416 is executed; otherwise, step S410 is executed. The MTC user equipment judges whether the group paging information is needed through the group identity of the group paging information, that is, the MTC UE belongs to the group ID, then it represents that the group paging information is needed by the MTC UE. If the group paging information is not needed, the MTC UE ignores the received group paging information and continues to monitor the group paging information.

Step S416, the MTC UE receives the group trigger information. The MTC UE further reads the group trigger information.

Example Embodiment II

Figure 5:
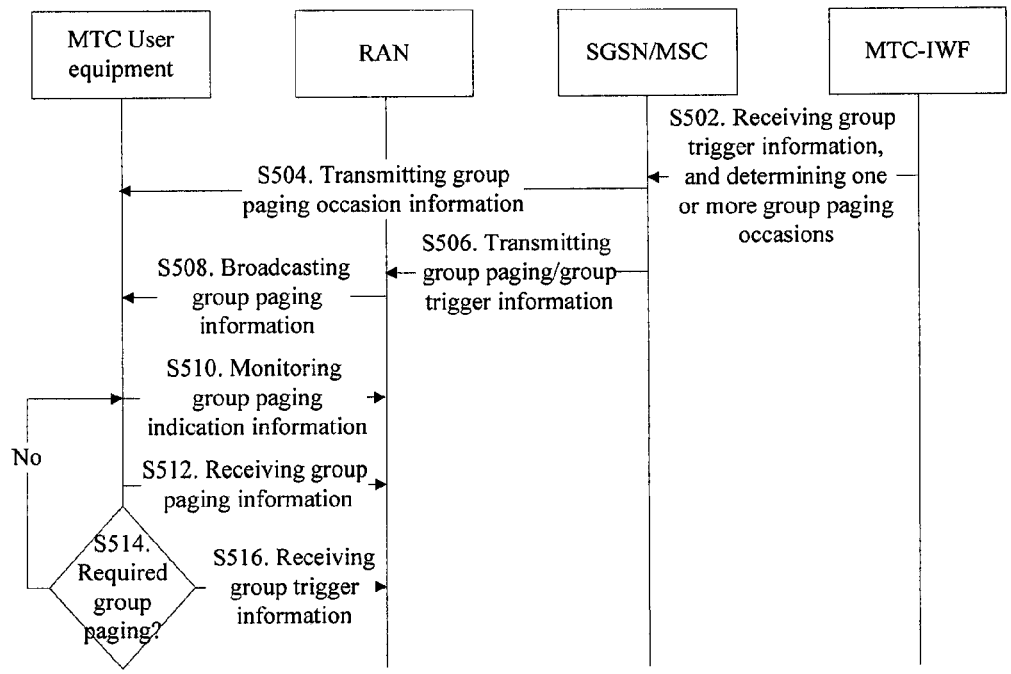
FIG. 5 is an interaction flowchart of a paging method for MTC user equipment according to example embodiment II of the present document.

FIG. 5 is an interaction flowchart of a paging method for MTC user equipment according to example embodiment II of the present document, this example embodiment describes an UTRAN/GERAN system, and paging information is transmitted through system information to realize the scenario of paging one group of MTC user equipment trigger information. As shown in FIG. 5, the method includes the following steps.

Step S502, an SGSN/MSC receives group trigger information and determines one or more group paging occasions.

In this step, the group trigger information may be received through T4 or T5. The group trigger information refers to that a target MTC user equipment identity is a group ID, for example, the SGSN/MSC judges that the received trigger information is the group trigger information through the indication information received from an MTC-IWF or through the information queried by an HSS/HLR.

It should be noted that the group trigger information generally contains regions (such as RAI/LAI/cell ID) corresponding to the group trigger information, that is, in which regions the group trigger information is transmitted. A group paging occasion refers to the transmitting time of the group paging, that is, a time domain occasion. If the group trigger information corresponds to multiple SGSN/MSCs, then the MTC-IWF specifies one or more group paging occasions, or the multiple SGSN/MSCs determine the one or more group paging occasions through negotiation.

Step S504, the SGSN/MSC broadcasts group paging occasion information to the MTC UE through an access network (RAN) node.

The access network node includes at least one of the following: an RNC, an eNB, a NodeB, a BSC and a BTS. The access network nodes are all access network nodes connected to the SGSN/MSC or access network nodes where the target MTC UE is located. The broadcast is transmitted through the system information. The broadcast information includes the transmitting time of the group paging information, and moreover, the broadcast information may further include the group identity.

Step S506, the SGSN/MSC transmits the group paging information and the group trigger information to the access network node.

The SGSN/MSC transmits the group paging information and the group trigger information to the access network node through the Iu or A/Gb interface, wherein the group paging information includes the MTC user equipment group ID.

Step S508, the access network node transmits the group paging at the one or more paging occasions.

In this step, the group paging includes the group paging indication information and the group paging information. The group paging information is transmitted through the system information, wherein the system information is the existing system information (such as the system information corresponding to the MTC UE) or the dedicated system information.

Step S510, the MTC UE monitors the group paging indication information at the one or more paging occasions.

The group paging indication information is physical layer information, which refers to the information indicated in a dedicated physical channel, such as a page indication channel (PICH).

Step S512, the MTC UE which has detected the group paging indication information reads the group paging information.

The MTC UE detects the page indication channel, which indicates that the information is the group paging indication information. The group paging information is used for indicating the change of the system information containing the group trigger information to the MTC user equipment group, wherein the content thereof contains the group ID, and the MTC user equipment judges whether the paging information is needed through the group ID.

Step S514, it is judged whether the group paging information is needed, if so, step S516 is executed; otherwise, step S510 is executed. The MTC user equipment judges whether the group paging information is needed through the group identity of the group paging information, that is, the MTC UE belongs to the group ID, then it represents that the group paging information is needed by the MTC UE. If the group paging information is not needed, the MTC UE ignores the received group paging information and continues to monitor the group paging indication information.

Step S516, the MTC UE receives the group trigger information. The MTC UE further reads the group trigger information.

Example Embodiment III

Figure 6:
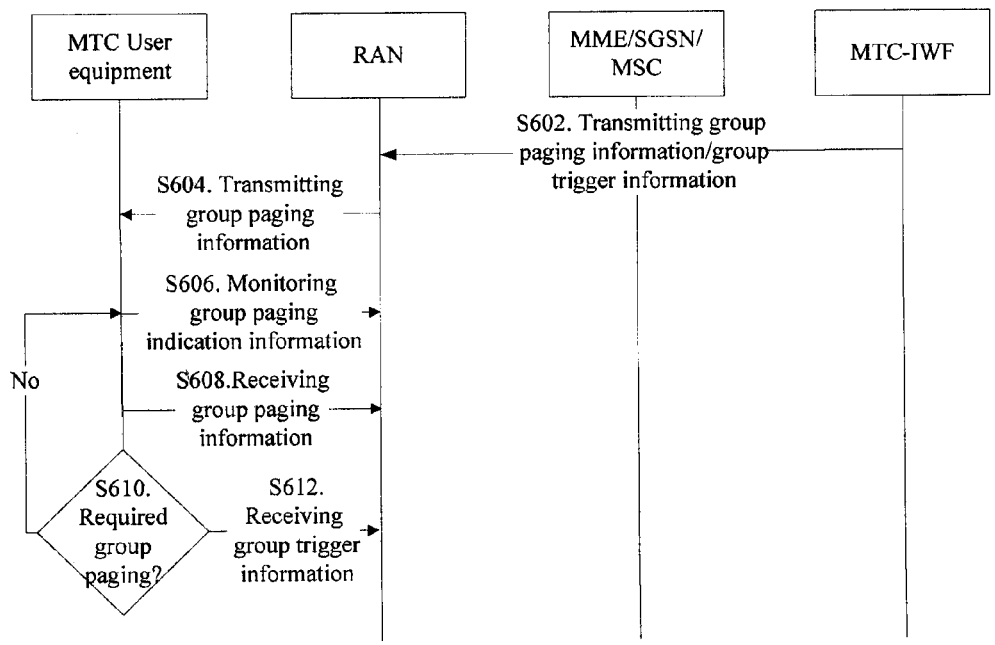
FIG. 6 is an interaction flowchart of a paging method for MTC user equipment according to example embodiment III of the present document.

FIG. 6 is an interaction flowchart of a paging method for MTC user equipment according to example embodiment III of the present document. This example embodiment describes calculating one or more paging occasions through a group IMSI and transmitting paging information through dedicated paging information to realize the scenario of paging one group of MTC user equipment trigger information. As shown in FIG. 6, the method includes the following steps.

Step S602, the MME/SGSN/MSC receives group trigger information and transmits group paging information and group trigger information to an access network node.

The group trigger information includes a group paging identity group IMSI or group TMSI, and further includes a group ID index for calculating a paging time PF/PO. The group IMSI and group TMSI are dedicated identities for indicating an MTC UE group, that is, the group IMSI and group TMSI does not correspond to a specific MTC UE; and the group ID index is obtained by calculation on the group IMSI for calculating the PF/PO.

Step S604, the access network node transmits the group paging indication information and the group paging information at one or more paging occasions. The access network node calculates one or more paging occasions according to the received group IMSI.

The group paging indication information is transmitted through physical layer information; and the group paging information is transmitted through dedicated paging information, which is dedicated RRC signalling herein. The group paging information contains a group identity, and the group identity can be any one of the following: a group ID, a group IMSI and a group TMSI.

Step S606, the MTC UE calculates one or more paging occasions, and monitors the group paging indication information at one or more paging occasions. The MTC UE calculates one or more paging occasions according to an MTC group to which it belongs; specifically, the MTC UE firstly determines a corresponding group IMSI, and calculates the group paging occasion PF/PO using the group IMSI.

Step S608, the MTC UE monitoring the group paging indication information reads the group paging information. The MTC UE detects a group paging identity or a group paging indication channel in a physical layer, which indicates that the information is the group paging indication information; and the group paging information is used for indicating the change of the system information containing the group trigger information to the MTC user equipment group.

Step S610, it is judged whether the group paging information is needed, if so, step S612 is executed; otherwise, step S606 is executed. The MTC user equipment judges whether the group paging information is needed through the group identity of the group paging information, that is, the MTC UE belongs to the group ID, then it indicates that the group paging information is needed by the MTC UE. If the group paging information is not needed, the MTC UE ignores the received group paging information and continues to monitor the group paging indication information.

Step S612, the MTC UE receives the group trigger information. The MTC UE further reads the group trigger information.

It should be noted that the steps shown in the flowchart of the drawings can be executed, for example, in a computer system with a set of instructions executable by a computer, in addition, a logic order is shown in the flowchart, but the shown or described steps can be executed in a different order under some conditions.

Figure 7:
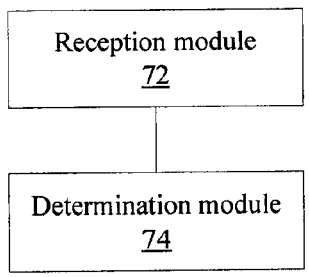
FIG. 7 is a structure diagram of a paging device for MTC user equipment according to an embodiment of the present document.

The embodiments of the present document further provide a paging device for MTC user equipment, which is applied to the MTC user equipment, and the paging device for the MTC user equipment can be used to realize the above-mentioned paging method for the MTC user equipment. FIG. 7 is a structure diagram of a paging device for MTC user equipment according to an embodiment of the present document. As shown in FIG. 7, a reception module 72 and a determination module 74 are included, which are described below in detail.

The reception module 72 is configured to receive group paging indication information and group paging information transmitted at one or more paging occasions by a network side, wherein the one or more paging occasions are notified to the MTC user equipment group by the network side or acquired by calculation according to a group identity of the MTC user equipment group, the group paging indication information is used for indicating presence of the group paging information, and the group paging information is used for indicating a change in group trigger information; and a determination module 74, which is coupled to the reception module 72 and is configured to determine, according to the group paging information, whether or not further reading of the group trigger information is needed.

In an example embodiment, the above-mentioned device further includes: a monitoring module, which is configured to monitor the group paging indication information at the one or more paging occasions; and a reading module, which is coupled to the monitoring module and is configured to read the group paging information in the case where the group paging indication information is detected.

In an example embodiment, the determination module 74 includes: a judgement unit, which is configured to judge, according to a group identity in the group paging information, whether the group paging information is corresponding to the MTC user equipment group; a reading unit, which is coupled to the judgement unit and is configured to read the group trigger information in the case where the judgement result is yes, wherein the group trigger information is used for triggering the MTC user equipment in the MTC user equipment group; and a processing unit, which is coupled to the judgement unit, and is configured to discards the group paging information in the case where the judgement result is no and continue to monitor the group paging indication information.

It should be noted that the paging device for the MTC user equipment described in the apparatus embodiments corresponds to the above-mentioned method embodiments, with the specific implementation described in the method embodiment in detail, thereby needing no further description.

Figure 8:
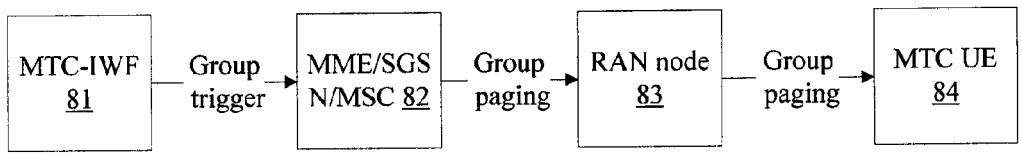
FIG. 8 is a structure diagram of a paging device for an MTC user according to an example embodiment of the present document.

In an example embodiment, as shown in FIG. 8, a paging system for MTC user equipment includes: an MTC-IWF 81, an MME/SGSN/MSC 82, an access network node 83 and MTC user equipment 84.

The MTC-IWF 81 is configured to transmit the group trigger information to the MME/SGSN/MSC 82 through T4/T5 interface, and is also configured to indicate regions of the group trigger information to the MME/SGSN/MSC 82, and is further configured to indicate one or more group paging occasions to the MME/SGSN/MSC 82.

The MME/SGSN/MSC 82 is configured to receive the group trigger information transmitted by the MTC-IWF 81 and transmit the group trigger information to the access network node 83, and is also configured to generate the group paging information and transmit the group paging information to the MTC user equipment 84 through the access network node 83; and is also configure to determine information of the one or more group paging occasions and transmit same to the access network node 83.

The access network node (i.e. the RAN node) 83 is configured to receive the group trigger information, group paging indication information, group paging information and group paging occasion information transmitted by the MME/SGSN/MSC 82, and transmit the group paging information and the group trigger information to the MTC user equipment 84. The group paging indication information is transmitted through the physical layer information, and the group paging information is transmitted through the system information or the dedicated RRC information; and the access network node includes at least one of the following: a BSC, a BTS, an RNC, a NodeB and an eNodeB.

The MTC user equipment 84 is configure to monitor the group paging indication information, receive the group paging information according to the group paging indication information, and judge whether the group trigger information is received according to the group paging information. The MTC user equipments are a group of MTC UEs, that is, two or more MTC user equipments, which are configure to monitor the group paging indication information and receive the group paging information, and determine whether the group trigger information is received according to the group paging information, which can be an MTC user equipment gateway or a single MTC user equipment.

In summary, according to the above-mentioned embodiments of the present document, a paging method and device for MTC user equipment are provided. In the embodiments of the present document, the network side transmits the group paging information and the group paging indication information at one or more designated occasions, and the MTC user equipment group determines, according to the group paging indication information and the group paging information, whether or not to read the group trigger information, thus the subsequent operation of communicating with an MTC server is performed. Simultaneous paging of a group of MTC user equipment is implemented, group paging process is optimized, and network resources occupied during the group paging process is reduced.

Obviously, those skilled in the art shall understand that the above-mentioned modules and steps of the disclosure can be realized by using general purpose calculating device, can be integrated in one calculating device or distributed on a network which consists of a plurality of calculating devices. Alternatively, the modules and the steps of the disclosure can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present document is not restricted to any particular hardware and software combination.

The above description is only example embodiments of the present document and is not intended to limit the present document, and the present document can have a variety of changes and modifications for ordinary person skilled in the field. Any modification, equivalent replacement, or improvement made within the principle of the present document shall all fall within the protection scope as defined in the appended claims of the present document.

What is claimed is:

1. A paging method for machine type communication (MTC) user equipment, comprising:

MTC user equipment in an MTC user equipment group receiving group paging indication information and group paging information transmitted at one or more paging occasions by a network side, wherein the one or more paging occasions are notified to the MTC user equipment group by the network side or acquired by calculation according to a group identity of the MTC user equipment group, the group paging indication information is used for indicating presence of the group paging information, and the group paging information is used for indicating a change in group trigger information; and the MTC user equipment determining, according to the group paging information, whether it is needed to further read the group trigger information, wherein the group paging indication information is physical layer information, and is indicated in the form of a group radio network temporary identity (RNTI).

2. The method according to claim 1, wherein the MTC user equipment determining, according to the group paging information, whether it is needed to further read the group trigger information, the method further comprises:

the MTC user equipment monitoring the group paging indication information at the one or more paging occasions; and if the group paging indication information is detected, the MTC user equipment reading the group paging information.

3. The method according to claim 2, wherein the group paging indication information is transmitted through a dedicated physical channel or is indicated by a dedicated identity on a universal physical channel; and the group paging information is transmitted through system information or dedicated paging information.

4. The method according to claim 1, wherein the MTC user equipment determining, according to the group paging information, whether it is needed to further read the group trigger information comprises:

the MTC user equipment judging, according to a group identity in the group paging information, whether the group paging information is corresponding to the MTC user equipment group;

based on a result of the judging representing that the group paging information is corresponding to the MTC user equipment group, the MTC user equipment reading the group trigger information, wherein the group trigger information is used for triggering the MTC user equipment in the MTC user equipment group; and based on a result of the judging representing that the group paging information is not corresponding to the MTC user equipment group, the MTC user equipment discarding the group paging information and continuing to monitor the group paging indication information.

5. The method according to claim 4, wherein the group paging indication information is transmitted through a dedicated physical channel or is indicated by a dedicated identity on a universal physical channel; and the group paging information is transmitted through system information or dedicated paging information.

6. The method according to claim 1, wherein before the MTC user equipment in the MTC user equipment group receives the group paging indication information and the group paging information transmitted at the one or more paging occasions by the network side, the method further comprises:

a service node of the MTC user equipment group receiving the group trigger information and determining the one or more paging occasions;

the service node transmitting the group trigger information to an access network node and transmitting information of the one or more paging occasions to the MTC user equipment group through the access network node; and the access network node transmitting the group paging indication information and the group paging information to the MTC user equipment group at the one or more paging occasions.

7. The method according to claim 6, wherein the service node comprises at least one of the following: a mobility management entity (MME), a serving general packet radio service support node (SGSN), and a mobile switching centre (MSC).

8. The method according to claim 7, wherein the group paging indication information is transmitted through a dedicated physical channel or is indicated by a dedicated identity on a universal physical channel; and the group paging information is transmitted through system information or dedicated paging information.

9. The method according to claim 6, wherein the service node of the MTC user equipment group determining the one or more paging occasions comprises: if the group trigger information corresponds to multiple service nodes, an MTC interworking function specifying the one or more paging occasions, or the multiple service nodes determining the one or more paging occasions through negotiation.

10. The method according to claim 9, wherein the group paging indication information is transmitted through a dedicated physical channel or is indicated by a dedicated identity on a universal physical channel; and the group paging information is transmitted through system information or dedicated paging information.

11. The method according to claim 6, wherein the group paging indication information is transmitted through a dedicated physical channel or is indicated by a dedicated identity on a universal physical channel; and the group paging information is transmitted through system information or dedicated paging information.

12. The method according to claim 1, wherein calculating the one or more paging occasions according to the group identity of the MTC user equipment group comprises:

the network side calculating one or more paging occasions for sending paging according to the group identity; and the MTC user equipment calculating one or more paging occasions for receiving the paging according to the group identity.

13. The method according to claim 12, wherein the group identity comprises at least one of the following: a group ID and a group international mobile subscriber identity (IMSI).

14. The method according to claim 12, wherein the group paging indication information is transmitted through a dedicated physical channel or is indicated by a dedicated identity on a universal physical channel; and the group paging information is transmitted through system information or dedicated paging information.

15. The method according to claim 1, wherein the group paging information comprises at least the group identity of the MTC user equipment group, wherein the group identity comprises at least one of the following: a group ID and a group IMSI.

16. The method according to claim 1, wherein the group paging indication information is transmitted through a dedicated physical channel or is indicated by a dedicated identity on a universal physical channel; and the group paging information is transmitted through system information or dedicated paging information.

17. The method according to claim 1, wherein the network side comprises at least: an MTC-interworking function (MTC-IWF), an MME, an SGSN, an eNB, a NodeB, a radio network controller (RNC) and a base station controller (BSC).

18. A paging device for machine type communication (MTC) user equipment, wherein the paging device is applied to MTC user equipment and comprises:
- a reception module, which is configured to receive group paging indication information and group paging information transmitted at one or more paging occasions by a network side, wherein the one or more paging occasions are notified to the MTC user equipment group by the network side or acquired by calculation according to a group identity of the MTC user equipment group, the group paging indication information is used for indicating presence of the group paging information, and the group paging information is used for indicating a change in group trigger information; and
- a determination module, which is configured to determine, according to the group paging information, whether or not further reading of the group trigger information is needed;
- wherein the group paging indication information is physical layer information, and is indicated in the form of a group radio network temporary identity (RNTI).

19. The device according to claim 18, wherein the group identity comprises at least one of the following: a group ID and a group IMSI.

* * * * *